(12) United States Patent
Martin

(10) Patent No.: US 6,260,771 B1
(45) Date of Patent: Jul. 17, 2001

(54) WINDSHEILD WASHER VALVE

(75) Inventor: Uwe Martin, Bebra (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/665,739

(22) Filed: Sep. 20, 2000

Related U.S. Application Data

(63) Continuation of application No. 09/162,468, filed on Sep. 24, 1998, now Pat. No. 6,155,299.

(30) Foreign Application Priority Data

Jun. 10, 1997 (DE) .............................. 197 44 040

(51) Int. Cl.⁷ .................................. B60S 1/46
(52) U.S. Cl. .................. 239/284.1; 239/570; 137/846
(58) Field of Search ................ 239/284.1, 284.2, 239/570, 571; 137/846

(56) References Cited

U.S. PATENT DOCUMENTS

| | | | | |
|---|---|---|---|---|
| 2,598,601 | * | 5/1952 | Rappl | 239/284.1 X |
| 2,616,581 | * | 11/1952 | Madsen et al. | 239/284.1 X |
| 3,199,787 | * | 8/1965 | Oishei et al. | 239/284.1 |
| 4,426,062 | | 1/1984 | Bowron . | |
| 5,163,619 | | 11/1992 | Wada . | |
| 5,636,794 | * | 6/1997 | Hess et al. | 239/284.1 |

FOREIGN PATENT DOCUMENTS

| | | | | |
|---|---|---|---|---|
| 1500159 | | 5/1970 | (DE) . | |
| 2749658 | * | 5/1979 | (DE) | 239/284.1 |
| 3807200 | | 10/1988 | (DE) . | |
| 3831380 | * | 4/1989 | (DE) | 239/284.1 |
| 0174521 | | 3/1986 | (EP) . | |
| 0738636 | | 10/1996 | (EP) . | |
| 1545811 | * | 11/1968 | (FR) | 239/284.1 |
| 2673154 | | 8/1992 | (FR) . | |
| 924557 | * | 4/1963 | (GB) | 239/284.1 |

* cited by examiner

*Primary Examiner*—Lesley D. Morris
(74) *Attorney, Agent, or Firm*—Martin A. Farber

(57) ABSTRACT

A valve device, in particular a window and lens cleaning device in motor vehicles, comprising a housing (1) with a duct (2) and at least one nozzle (3), and also a tubular connecting piece (4) for feeding a pressurized fluid, in particular a cleaning liquid, into the duct and to the nozzle. The connecting piece (4) is provided at its nozzle-side end with a nonreturn valve which blocks a return flow from the nozzle to the connecting piece wherein, the connecting piece (4) is open at its nozzle-side end. The nonreturn valve comprise an elastic shaped part (8) with a mouth which is normally closed and can be opened by the pressure of the cleaning liquid.

20 Claims, 1 Drawing Sheet

WINDSHEILD WASHER VALVE

This application is a continuation of application 09/162,468 filed Sep. 24, 1998, now U.S. Pat. No. 6,155,299 the contents of which are incorporated by reference herein in its entirety.

The invention relates to a valve device, in particular a window and lens cleaning device in motor vehicles.

There is a device which essentially comprises a plastic nozzle housing with a duct, two nozzles inserted at its end and also a connecting piece which is inserted into the duct on the other side and is fastened therein in a sealed manner, for feeding a cleaning liquid to the nozzles. At its end which faces the nozzles, the tubular connecting piece is provided with a nonreturn valve. This prevents the cleaning liquid from flowing back if the delivery pressure is reduced, for example by the relevant pump being switched off.

In detail, the known nonreturn valve is of similar construction to the inner tube valves known from older bicycle inner tubes. On its nozzle-side end, the tubular connecting piece is closed but has at least one hole in its circumferential surface. This hole is covered by a thin and elastic flexible tube which is pulled over the outside of the connecting piece. If the pressure in the interior of the connecting piece rises, the flexible tube is raised slightly due to the liquid emerging from the hole. This liquid then flows between the outer circumferential surface of the connecting piece and the inner wall of the flexible tube and emerges toward the nozzles.

Despite the relatively simple external construction, this arrangement has certain disadvantages with regard to flow through the nonreturn valve. The twisted and constricted overflow cross section increases the throttle resistance. On leaving the flexible tube, the liquid is as it were abruptly relieved of tension and atomized, with the result that an undesirable development of noise has to be attended to. In addition, at least at the beginning of each spraying process, if the region between the nonreturn valve and the nozzles is still empty or is only partially filled, for example because of evaporation, an air-water mixture is fed to the nozzles, the desired cleaning action thereby being reduced initially due to deficient spray pressure.

SUMMARY OF THE INVENTION

An object of the invention is to improve a valve device of the abovementioned type primarily-line with respect to flow technology but retaining its ability to be installed in a simple manner and having few parts.

If, in contrast to the prior art discussed at the beginning, the connecting piece is open at its end pointing toward the nozzle and this opening is covered by a normally closed mouth of an elastic shaped part, which mouth is opened by fluid pressure, the flow resistance of the valve device is thereby clearly reduced with the effect remaining the same.

According to an advantageous feature of the invention, the mouth has a flat-nozzle-like cross section and is orientated toward the nozzle in the axial direction of the duct between the open end of the connecting piece and the nozzle. This eliminates flow deflection and throttle losses can thus be minimized.

In a particularly advantageous manner, the shaped part has a tubular section which is pulled over the connecting piece with undersize and from which there emerge two lips which bear against one another in an unpressurized manner and form the mouth. These lips can be slightly pressed apart by the fluid and only interfere slightly with the jet passing through them.

In the context of simple installation and reducing the multitude of parts, there is a great advantage if the elastic shaped part seals off that region of the duct which follows the mouth by filling an annular gap formed between the connecting piece and the housing.

If the elastic shaped part, at its end which is remote from the nozzle, has a thickened portion which encircles it annularly and surrounds the connecting piece, this thickened portion, as an integral annular seal between the connecting piece and the housing, is able to provide the necessary sealing of the end section of the duct.

The duct preferably forms an annular shoulder, which is remote from the nozzle, as a stop for the connecting piece which is to be pushed in. This gives the fitter tangible feedback that the end position of the connecting piece in the housing has been reached. At the same time, this annular shoulder may serve in a particularly functional manner as a bearing surface for the thickened portion of the elastic shaped part and thus forms part of the sealing of the duct toward the outside.

A substantial advantage with regard to quality assurance is achieved if a stop which limits the insertion depth of the connecting piece into the duct is provided. The connecting piece can then be pushed into the duct only as far as a fixed depth which is independent of the annular shoulder on the duct side. Inadvertent squeezing of the elastic shaped part is thus reliably prevented. Of course, a stop of this type could be provided on the duct side or could be realized by means of an additional component. In a particularly simple manner, this stop is however formed by an annular collar which is molded onto the connecting piece and the external diameter of which is larger than the diameter of the duct on the insertion side.

The shaped part is furthermore particularly protected, in an expedient manner, against damage during installation by virtue of the fact that its external diameter is essentially smaller than the external diameter of the insertion section of the connecting piece and the latter has, on its end-side outer edge, a groove over which the elastic shaped part can be pulled. Only the elastic thickened portion should have the same external diameter as the insertion section or else should protrude slightly radially over the latter.

The thickened portion then moves with axial pretension against the abovementioned annular shoulder and is thus particularly expediently released from the effect of pressure. Its axial compression causes it to expand radially, with the result that it deploys its sealing action outward and inward both in the axial direction and in the radial direction.

Finally, it is of great advantage for the installation if the connecting piece is fixed in its fitted position in a form-fitting manner with respect to the housing and/or the inner wall of the duct by latching means since separate maneuvers to secure the connecting piece in the housing can be dispensed with and the entire procedure can also be mechanized if need be.

Further details and advantages of the subject matter of the invention emerge from the drawing of an exemplary embodiment and the subsequent, detailed description thereof in the following.

BRIEF DESCRIPTION OF THE DRAWINGS

With the above and other objects in view, the present invention will become more clearly understood in connection with the detailed description of a preferred embodiment, when considered with the accompanying drawings of which.

In a simplified representation

BRIEF DESCRIPTION OF THE PREFERRED EMBODIMENTS

Figure 1:
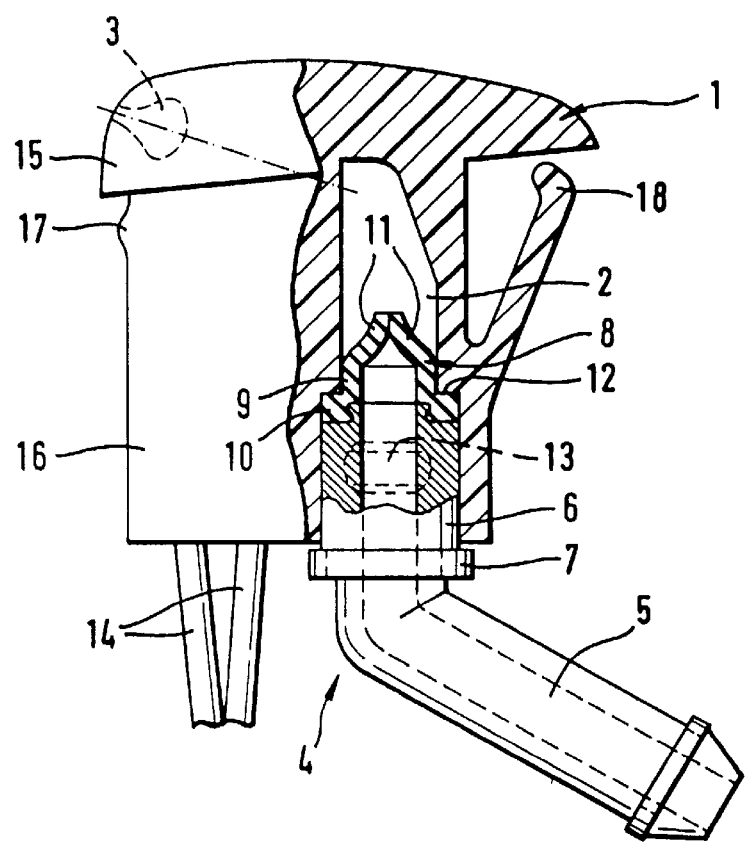
FIG. 1 shows a sectional representation through the valve device in the closed position of the nonreturn valve.

According to FIG. 1, a housing 1, which is preferably made of moldable plastic, has a duct 2 hollowed out in it. A dash-dotted line which points obliquely upward to the left shows the continuation of the duct to a nozzle 3 (indicated in a dot-line). A tubular connecting piece 4 is inserted into that end of the duct 2 which is remote from the nozzle 3.

The connecting piece 4 essentially comprises a flexible tube stub 5 which protrudes outward out of the housing 1, extends here at an angle with respect to the duct 2 and has an end-side thickened portion, which makes it difficult to pull off a flexible tube which has been pulled on (not shown here)the outside of the flexible tube stub 5, and a cylindrical insertion section 6 which is introduced into the duct 2 and has an end which is open toward the duct 2. At a distance from the duct-side end of the insertion section, an annular collar 7 protrudes over the outer circumferential surface of the connecting piece, the external diameter of which annular collar is greater than the diameter of the duct section into which the insertion section 6 is inserted. The open end of the insertion section 6 can be closed by means of an elastic shaped part 8 serving as a nonreturn valve. By means of a tubular section 9, this shaped part is pulled over the outside of the end section 6, or is slipped onto a groove formed at its end-side outer edge, with a slight undersize. On its outer edge, the shaped part has a thickened portion 10 which encircles it annularly. The external diameter of the thickened portion at least approximately corresponds to the external diameter of the insertion section 6. Two elastically deformable sealing lips 11 emerge on the other side from the tubular section 9, the ends of which sealing lips bear against one another with slight pretension.

At a distance from its opening, the inner wall of the duct 2 forms an annular shoulder 12. This reduces the internal diameter of the duct 2 in a steplike manner from a size which corresponds to the external diameter of the insertion section 6 of the connecting piece 4 and to the annular thickened portion 10 of the shaped part 8 approximately to the external diameter of the tubular section 9 of the shaped part 8. The annular shoulder 12 forms an installation end stop for the annular thickened portion 10, the annular collar 7 of the connecting piece 4 reliably preventing inadvertent squeezing of the elastically deformable thickened portion 10 since said annular collar can only approach the housing 1 as far as its outer edge.

The connecting piece 4 and its insertion section 6 are fixed in the housing 1 and in the inner wall of the duct 2, respectively, by means of a latching connection 13 (likewise indicated in dashed lines). This latching connection snaps elastically into place as soon as the annular thickened portion 10 bears in a slightly compressed manner with axial pretension against the annular shoulder 12 of the duct 2. In this manner, with one maneuver the connecting piece 4 is fixed in the duct 2 and its nozzle-side end section or cavity is sealed off from the: outside by the thickened portion 10. It is ensured at the same time that sufficient pretension is also produced in the gap between the connecting piece and the elastic shaped part, which pretension prevents fluid from seeping out.

A particularly favorable feature in this case is that the seal acts both in the axial direction and in the radial direction since the thickened portion expands radially due to the axial pretension and compression.

Once fluid is located in this duct section behind the nonreturn valve, it can only emerge through the nozzle 3.

Figure 2:
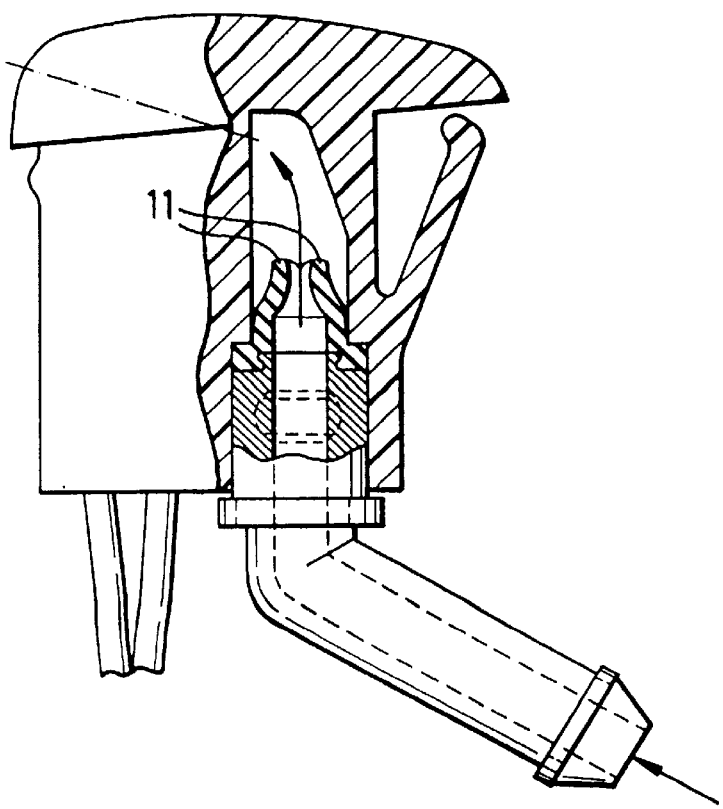
FIG. 2 shows the valve device with the nonreturn valve opened by fluid pressure.

FIG. 2 illustrates that the sealing lips of the elastic shaped part 8 open when the connecting piece 4 is subjected to pressure and release an overflow cross section through which a jet of fluid (indicated by arrows), in particular cleaning liquid for a vehicle window or headlight lens, can emerge towards the nozzle 3.

The entire valve device/window and lens cleaning device can be preassembled from few component parts with few maneuvers very rapidly without error.

On the left, next to the duct 2 the housing 1 preferably furthermore accommodates a heating device which can be supplied electrically by two downwardly emerging connecting cables 14. The housing 1 is provided for releasable latching into a recess of a thin body part, for example a front hood or a fender of a motor vehicle. For this purpose, it has a head 15 and a shank 16 which springs back with respect to the head and onto which are molded a latching lug 17 on one side, and on the other side an elastically deformable clip hook 18. During installation, the preassembled valve device is introduced from the outside into the recess in the metal panel until the lower edge of the head 15, which lower edge projects in a stepped manner with respect to the shank 16, rests on the edge of the recess. The latching lug 17 and the clip hook 18 pass through the recess, come into contact with the lower side of the metal panel and thus secure the valve device releasably in the recess.

After this, only the connections for electricity and fluid still have to be provided.

What is claimed is:

1. A valve device, comprising:
   a housing having a duct and at least one nozzle;
   a tubular connecting piece connected for supplying pressurized liquid into said duct and via said duct to said nozzle, said duct having a first end facing said nozzle and a second end opposite said first end and facing away form said nozzle, a portion of said duct being characterized by a change of diameter defining a shoulder facing away from said nozzle, said connecting piece having an insertion section which is insertable into the second end of said duct for connecting said connection piece to said housing, the insertion section facing said shoulder;
   a nonreturn valve located in said duct, said valve having a first end facing the nozzle and a second end opposite the first end and facing away from the nozzle, said valve comprising an elastic shaped part having a normally closed mouth which is openable by pressure of the liquid, said mouth being at said first end of said valve, said shaped part including a tubular section located at said second end of said valve and extending across said shoulder, said nonreturn valve blocking return flow from the nozzle to the connecting piece; and
   wherein said tubular section of said valve is secured by compression between said said insertion section and said shoulder.

2. The valve device as claimed in claim 1, wherein the mouth of the shaped part has a flat-nozzle-like cross section and is oriented toward the nozzle in an axial direction of the duct.

3. The valve device as claimed in claim 1, wherein said tubular section of said elastic shaped part is pulled over a nozzle-side end of the connecting piece, said shaped part has two sealing lips projecting from said tubular section, said two sealing lips bear against one another in an unpressurized manner and form the mouth.

4. The valve device as claimed in claim 3, wherein said tubular section of said elastic shaped part is undersized, and said undersized tubular section is pulled over the nozzle-side end of the connecting piece.

5. The valve device as claimed in claim 1, wherein there is an annular gap formed between the connecting piece and the housing, and said elastic shaped part fills said annular gap sealing a region of the duct at said shoulder.

6. The valve device as claimed in claim 1, wherein said elastic shaped part has a thickened annular portion at the second end of the valve, and said thickened portion surrounds said connecting piece about a nozzle-side end of the connecting piece.

7. The valve device as claimed in claim 6, wherein said connecting piece has a fitted position in which said thickened portion of said elastic shaped part bears against said annular shoulder with pretension in an axial direction of the duct.

8. The valve device as claimed in claim 7, further comprising a latching connection, wherein the connecting piece is fixed in said fitted position by said latching connection to said housing.

9. The valve device as claimed in claim 7, wherein the connecting piece is fixed in the fitted position in a form-fitting manner with respect an inner wall of the duct by latching means.

10. The valve device as claimed in claim 7, wherein the connecting piece is fixed in the fitted position in a form-fitting manner with respect to the housing by latching means.

11. The valve device as claimed in claim 6, wherein said insertion section of the connecting piece has, on an end-side outer edge, a groove over which said thickened annular portion of the elastic shaped part is mountable, and wherein the external diameter of the thickened portion of the elastic shaped part is smaller than an external diameter of the insertion section of the connection piece.

12. The valve device as claimed in claim 11, wherein the thickened portion has an external diameter which is the same as the external diameter of the insertion section.

13. The valve as claimed in claim 1, wherein said annular shoulder serves as a stop for said connecting piece inserted into said duct.

14. The valve device as claimed in claim 13, wherein said annular shoulder is situated remotely from said nozzle.

15. The valve device as claimed in claim 1, wherein the connecting piece has a stop for limiting an insertion depth of the connecting piece in the duct.

16. The valve device as claimed in claim 15, wherein said stop is formed by an annular collar which is integrally molded onto the outside of said connecting piece, said annular collar having an external diameter which is greater than an internal diameter of said duct at the second end of said duct.

17. The valve device as claimed in claim 1, wherein the valve device is operative with a window and lens cleaning device in motor vehicles.

18. The valve device as claimed in claim 1, wherein said pressurized liquid is cleaning liquid.

19. The valve as claimed in claim 1, further comprising an elastic latching connection in said housing for retaining said insertion section within said duct to maintain said compression of the tubular section of said valve.

20. A valve device, comprising:

a housing having a duct and at least one nozzle;

a tubular connecting piece connected for supplying pressurized liquid into said duct and via said duct to said nozzle, said connecting piece having an insertion section which is insertable into said duct for connecting said connection piece to said housing;

a nonreturn valve located in said duct on a nozzle-side end of said connecting piece, said connecting piece being open at said nozzle-side end, said nonreturn valve blocking return flow from the nozzle to the connecting piece;

wherein said nonreturn valve comprises an elastic shaped part having a normally closed mouth which is openable by pressure of the liquid, said mouth being oriented toward said nozzle, said shaped part including a tubular section located opposite said mouth and engaging said connection piece;

said tubular section is secured by compression between said said insertion section and said housing;

in the forward direction of fluid flow through the valve, fluid flows via the valve into the nozzle, and in a closed state of the valve, no fluid flows into the nozzle; and an elastic latching connection in said housing for retaining said insertion section within said duct to maintain said compression of the tubular section of said valve.

* * * * *